US007519796B1

(12) United States Patent
Golla et al.

(10) Patent No.: US 7,519,796 B1
(45) Date of Patent: Apr. 14, 2009

(54) EFFICIENT UTILIZATION OF A STORE BUFFER USING COUNTERS

(75) Inventors: Robert T. Golla, Round Rock, TX (US); Mark A. Luttrell, Cedar Park, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 354 days.

(21) Appl. No.: 10/881,935

(22) Filed: Jun. 30, 2004

(51) Int. Cl.
*G06F 9/00* (2006.01)
(52) U.S. Cl. .................................................. 712/225
(58) Field of Classification Search .................. 712/225
See application file for complete search history.

(56) References Cited

U.S. PATENT DOCUMENTS

| | | | |
|---|---|---|---|
| 5,446,854 A | 8/1995 | Khalidi et al. | |
| 5,712,791 A | 1/1998 | Lauterbach | 364/489 |
| 5,742,792 A | 4/1998 | Yanai et al. | |
| 5,761,707 A | 6/1998 | Aiken et al. | |
| 5,802,561 A | 9/1998 | Fava et al. | |
| 5,828,860 A | 10/1998 | Miyaoku et al. | |
| 5,862,450 A | 1/1999 | Mandal et al. | 455/3.1 |
| 5,918,005 A * | 6/1999 | Moreno et al. | 714/38 |
| 5,933,627 A | 8/1999 | Parady | 395/569 |
| 6,016,542 A | 1/2000 | Gottlieb et al. | 712/225 |
| 6,092,154 A | 7/2000 | Curtis et al. | 711/137 |
| 6,098,169 A | 8/2000 | Ranganathan | 712/227 |
| 6,141,692 A | 10/2000 | Loewenstein et al. | 709/234 |
| 6,247,121 B1 | 6/2001 | Akkary et al. | 712/239 |
| 6,272,520 B1 | 8/2001 | Sharangpani et al. | 709/108 |
| 6,295,600 B1 | 9/2001 | Parady | 712/228 |
| 6,308,279 B1 | 10/2001 | Toll et al. | 713/323 |
| 6,314,563 B1 | 11/2001 | Agesen et al. | 717/9 |
| 6,415,356 B1 * | 7/2002 | Chaudhry et al. | 711/118 |
| 6,493,819 B1 * | 12/2002 | Mahurin et al. | 712/210 |
| 6,535,905 B1 | 3/2003 | Kalafatis et al. | 709/108 |
| 6,578,137 B2 | 6/2003 | Parady | 712/228 |
| 6,609,193 B1 | 8/2003 | Douglas et al. | 712/219 |
| 6,625,654 B1 | 9/2003 | Wolrich et al. | 709/230 |

(Continued)

OTHER PUBLICATIONS

Hennessy, John, Patterson, David. "Computer Architecture: A Quantitative Approach." Morgan Kaufmann, third edition, pp. A-68 to A77.*

(Continued)

*Primary Examiner*—Eddie P Chan
*Assistant Examiner*—Jacob Petranek
(74) *Attorney, Agent, or Firm*—Osha • Liang LLP (57) ABSTRACT

An apparatus and method for efficiently managing store buffer operations is described in connection with a multi-threaded multiprocessor chip. A CMT processor keeps track of stores by maintaining two store counters in the instruction fetch unit (IFU). A speculative store counter in the IFU tracks stores in flight to the store buffer as well as stores already in the store buffer. A committed store counter in the IFU tracks the number of stores actually in the store buffer. The store buffer provides allocate and deallocate signals to accurately maintain the committed store counter. The IFU stops issuing stores to the store buffer once the speculative counter has reached a threshold value. Upon a flush, the IFU sets the speculative counter equal to the committed store counter. In this way, an efficient feedback mechanism is provided for preventing store buffer overflow that minimizes the store buffer size, operations time and power usage.

15 Claims, 7 Drawing Sheets

U.S. PATENT DOCUMENTS

| | | | |
|---|---|---|---|
| 6,633,984 B2 | 10/2003 | Susser et al. | 713/201 |
| 6,647,458 B1 | 11/2003 | Glynn | |
| 6,671,707 B1 | 12/2003 | Hudson et al. | 707/206 |
| 6,700,410 B2 | 3/2004 | Ebergen | 326/93 |
| 6,700,825 B1 | 3/2004 | Ebergen | 365/221 |
| 6,862,027 B2 | 3/2005 | Andrews et al. | |
| 7,003,648 B2 * | 2/2006 | Chrysos et al. | 712/26 |
| 7,149,851 B1 * | 12/2006 | Rozas et al. | 711/141 |
| 2001/0047468 A1 * | 11/2001 | Parady | 712/228 |
| 2002/0052926 A1 | 5/2002 | Bush et al. | 709/217 |
| 2002/0129309 A1 | 9/2002 | Floyd et al. | 714/724 |
| 2002/0199070 A1 | 12/2002 | Chaudhry et al. | |
| 2003/0088610 A1 | 5/2003 | Kohn et al. | 709/107 |
| 2003/0088713 A1 | 5/2003 | Mandal et al. | |
| 2003/0097518 A1 | 5/2003 | Kohn et al. | 711/5 |
| 2003/0105756 A1 | 6/2003 | Daynes | 707/8 |
| 2003/0105907 A1 | 6/2003 | Kohn et al. | 710/305 |
| 2003/0120825 A1 | 6/2003 | Avvari et al. | 709/316 |
| 2003/0149861 A1 | 8/2003 | Becker | 712/214 |
| 2003/0163645 A1 | 8/2003 | Tremblay et al. | 711/137 |
| 2003/0191927 A1 | 10/2003 | Joy et al. | 712/228 |
| 2003/0212874 A1 | 11/2003 | Alderson | 711/170 |
| 2004/0002974 A1 | 1/2004 | Kravitz et al. | 707/8 |
| 2004/0003208 A1 | 1/2004 | Damron | 712/225 |
| 2004/0003211 A1 | 1/2004 | Damron | 712/228 |
| 2004/0006633 A1 | 1/2004 | Chandra et al. | 709/231 |
| 2004/0034853 A1 | 2/2004 | Gibbons et al. | 717/174 |
| 2004/0073906 A1 | 4/2004 | Chamdani et al. | 718/102 |
| 2004/0117600 A1 | 6/2004 | Bodas et al. | |
| 2004/0123028 A1 | 6/2004 | Kanai et al. | |

OTHER PUBLICATIONS

Shen, John Paul, Lipasti, Mikko H. "Modern Processor Design: Fundamentals of superscalar processors" McGraw-Hill Companies, Inc. Edition 1, May 27, 2004. pp. 264-273.*

R. Heald et al., "A Third-Generation SPARC V9 64-b Microprocessor," IEEE JSSC, Nov. 2000, pp. 1526-1538.

"Igniting a Computing Revolution! Throughput Computing," Sun Microsystems Brochure.

"Introduction to Throughput Computing," Sun Mircosystems whitepaper, Feb. 2003.

D. Wendell et al., "A 4 MB On-Chip L2 Cache for a 90nm 1.6GHz 64 bit Microprocessor," IEEE JSSC (Feb. 2004).

G. Konstadinidis et al., "Implementation of a Third-Generation 1.1GHz 64b Microprocessor," 2002 IEEE Journal of Solid-State Circuits, vol. 37, No. 11, pp. 1461-1469 (Nov. 2002).

K. Krewell, "Sun Weaves Multithreaded Future," Microprocessor Report, Reed Electronics Group (Apr. 14, 2003).

"UltraSPARC® IV Processor," User's Manual Supplement, Sun Microsystems, version 1.0 (Apr. 2004).

"UltraSPARC® IV Processor," Datasheet, Sun Microsystems.

"The UltraSPARC® IIIi Processor" Architecture Overview, Technical Whitepaper, Sun Microsystems, version 1.2 (Apr. 2004).

"UltraSPARC® IV Processor," Architecture Overview, Technical Whitepaper, Sun Microsystems, Version 1.0 (Feb. 2004).

R. Ronen, "VLSI Architecture Design Course," Lecture #10, Multithreaded Architectures (dated May 2003).

K. Mai et al., "Smart Memories: A Modular Reconfigurable Architecture," Stanford University Proceedings of the 27th ISCA (Jun. 2000).

L. Hammond et al., "The Stanford Hydra CMP," IEEE Micro, pp. 71-84, (Mar.-Apr. 2000).

L. Hammond et al., "Considerations in the Design of Hydra: A Multiprocessor-on-a-Chip Microarchitecture," Technical Report No. CSL-TR-98-749, pp. 1-10 (Feb. 1998).

K. Privitt, et al., "Threading: Connecting the Pieces, System Architecture, Application, OS and Tools," Intel Developer Forum (Feb. 17-19, 2004).

* cited by examiner

EFFICIENT UTILIZATION OF A STORE BUFFER USING COUNTERS

BACKGROUND OF THE INVENTION

1. Field of the Invention

The present invention relates generally to the field of processor or computer design and operation. In one aspect, the present invention relates to memory operations in a multithreaded processor.

2. Description of the Related Art

Figure 1:
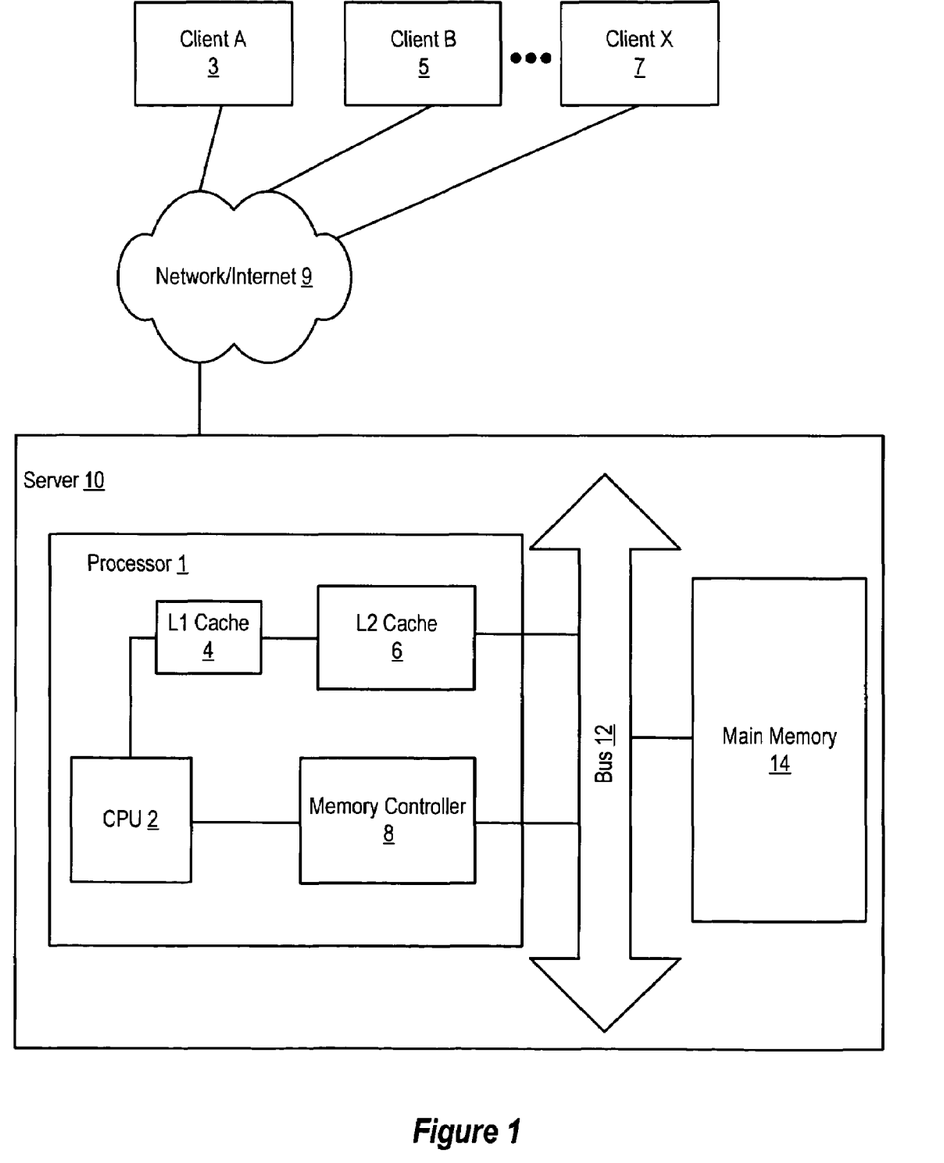
FIG. 1 illustrates a computer system in a communication network.

Computer systems are constructed of many components, typically including one or more processors that are connected for access to one or more memory devices (such as RAM) and secondary storage devices (such as hard disks and optical discs). For example, FIG. 1 is a diagram illustrating a computer system 10 with multiple memories. Generally, a processor 1 connects to a system bus 12. Also connected to the system bus 12 is a memory (e.g., 14). During processor operation, CPU 2 processes instructions and performs calculations. Data for the CPU operation is stored in and retrieved from memory using a memory controller 8 and cache memory, which holds recently or frequently used data or instructions for expedited retrieval by the CPU 2. Specifically, a first level (L1) cache 4 connects to the CPU 2, followed by a second level (L2) cache 6 connected to the L1 cache 4. The CPU 2 transfers information to the L2 cache 6 via the L1 cache 4. Such computer systems may be used in a variety of applications, including as a server 10 that is connected in a distributed network, such as Internet 9, enabling server 10 to communicate with clients A-X, 3, 5, 7.

Because processor clock frequency is increasing more quickly than memory speeds, there is an ever increasing gap between processor speed and memory access speed. In fact, memory speeds have only been doubling every six years-one-third the rate of microprocessors. In many commercial computing applications, this speed gap results in a large percentage of time elapsing during pipeline stalling and idling, rather than in productive execution, due to cache misses and latency in accessing external caches or external memory following the cache misses. Stalling and idling are most detrimental, due to frequent cache misses, in database handling operations such as OLTP, DSS, data mining, financial forecasting, mechanical and electronic computer-aided design (MCAD/ECAD), web servers, data servers, and the like. Thus, although a processor may execute at high speed, much time is wasted while idly awaiting data.

Figure 2A:
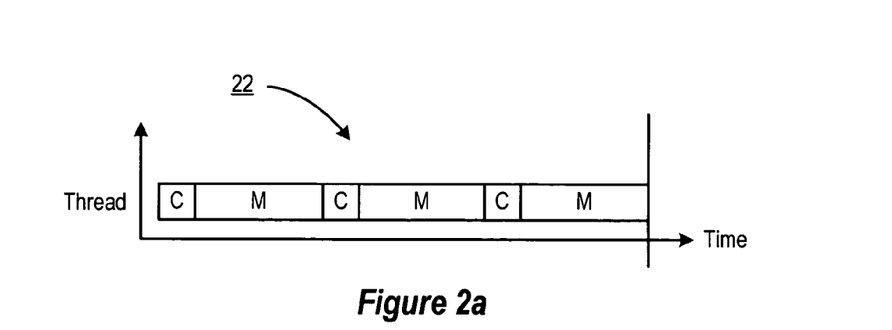
FIGS. 2a and 2b are timing diagrams respectively illustrating execution flows of a single-thread processor and a vertical multithread processor.
Figure 2B:
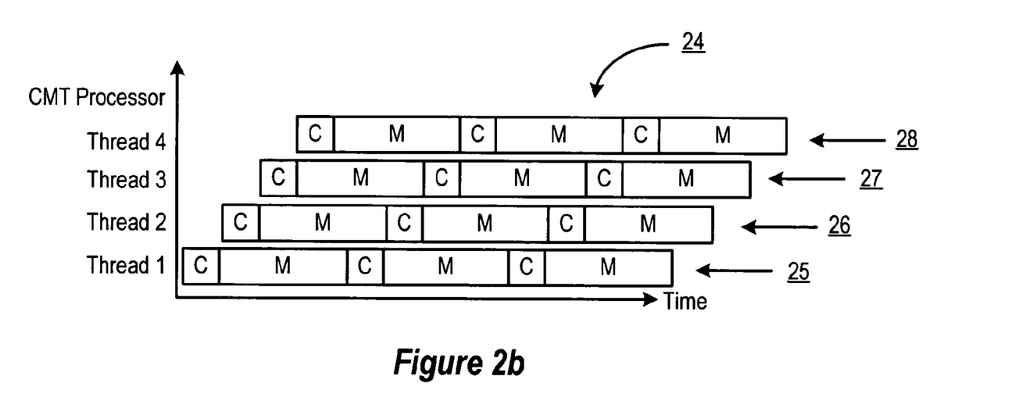

One technique for reducing stalling and idling is hardware multithreading to achieve processor execution during otherwise idle cycles. FIGS. 2a and 2b show two timing diagrams illustrating an execution flow 22 in a single-thread processor and an execution flow 24 in a vertical multithread processor. Processing applications, such as database applications and network computing applications, spend a significant portion of execution time stalled awaiting memory servicing. This is illustrated in FIG. 2a, which depicts a highly schematic timing diagram showing execution flow 22 of a single-thread processor executing a database application. The areas within the execution flow 22 labeled as "C" correspond to periods of execution in which the single-thread processor core issues instructions. The areas within the execution flow 22 labeled as "M" correspond to time periods in which the single-thread processor core is stalled waiting for data or instructions from memory or an external cache. A typical single-thread processor executing a typical database application executes instructions about 25% of the time with the remaining 75% of the time elapsed in a stalled condition. The 25% utilization rate exemplifies the inefficient usage of resources by a single-thread processor.

FIG. 2b is a highly schematic timing diagram showing execution flow 24 of similar database operations by a multi-thread processor. Applications, such as database applications, have a large amount inherent parallelism due to the heavy throughput orientation of database applications and the common database functionality of processing several independent transactions at one time. The basic concept of exploiting multithread functionality involves using processor resources efficiently when a thread is stalled by executing other threads while the stalled thread remains stalled. The execution flow 24 depicts a first thread 25, a second thread 26, a third thread 27 and a fourth thread 28, all of which are labeled to show the execution (C) and stalled or memory (M) phases. As one thread stalls, for example first thread 25, another thread, such as second thread 26, switches into execution on the otherwise unused or idle pipeline. There may also be idle times (not shown) when all threads are stalled. Overall processor utilization is significantly improved by multithreading. The illustrative technique of multithreading employs replication of architected registers for each thread and is called "vertical multithreading."

Vertical multithreading is advantageous in processing applications in which frequent cache misses result in heavy clock penalties. When cache misses cause a first thread to stall, vertical multithreading permits a second thread to execute when the processor would otherwise remain idle. The second thread thus takes over execution of the pipeline. A context switch from the first thread to the second thread involves saving the useful states of the first thread and assigning new states to the second thread. When the first thread restarts after stalling, the saved states are returned and the first thread proceeds in execution. Vertical multithreading imposes costs on a processor in resources used for saving and restoring thread states, and may involve replication of some processor resources, for example replication of architected registers, for each thread. In addition, vertical multithreading can overwhelm the processor core and/or memory system as stores are generated more quickly by the processor pipeline than can be processed by the cache or memory system.

The use of store buffers in processors is a common technique to improve performance and handle store operations issued by the processor. By buffering stores to the cache or memory, a program can continue to execute while waiting for the stores to issue to the cache or memory. Without the buffer, if the program was waiting on a store, it would be unable to perform another store and execution would halt. When using a store buffer, care must be taken to prevent the buffer from overflowing because a buffer overflow can cause instructions to be lost. At a basic level, this requires that no store instructions be issued when the store buffer is full. In pipeline processor applications, management of the buffer is complicated by the fact that the store buffer commit point in the pipeline is typically later in the pipeline than the final stall point in the pipeline. As a result, there can be stores in the pipeline, but not yet in the store buffer. Conventional store buffer solutions have provided a buffer count feedback from the buffer to the front of the pipeline, though such solutions can cause wiring congestion, create timing problems and force pipeline flushes. In particular, the use of a buffer count feedback signal requires multiple wires for each thread in the store buffer. Not only must additional time be provided to receive and process the buffer count feedback signal, but the circuit size and cost are increased. When the store buffer is located on the physical die at a distance away from the pipeline front end (e.g., the instruction fetch unit circuitry), the timing layout requirements are aggravated. Another conventional solution is to implement a high water mark strategy, though this generally results in low buffer utilization because it assumes all instructions in the pipeline are stores.

Accordingly, improved memory operations for multithreading and/or multiprocessor circuits and operating methods are needed that are economical in resources and avoid costly overhead which reduces processor performance. In addition, an efficient store buffer protocol is needed that maximizes the use of store buffer entries while keeping communication between the store buffers and the front end of the pipeline to a minimum. There is also a need for a store buffer method and system that efficiently processes store buffer entries without requiring elaborate feedback techniques to prevent overflow, especially for use in highly threaded processor applications where there the number of stores is increased. An improved store buffer management system and methodology is needed that minimizes the store buffer size, operations time and power usage. Further limitations and disadvantages of conventional systems will become apparent to one of skill in the art after reviewing the remainder of the present application with reference to the drawings and detailed description which follow.

SUMMARY OF THE INVENTION

Broadly speaking, the present invention is a method and system for implementing a store buffer management system that efficiently processes store buffer entries using an efficient counter mechanism at the front end of the pipeline. This mechanism requires minimum feedback from the store buffer. A speculative store counter in the instruction fetch unit (IFU) tracks stores in flight to the store buffer as well as stores already in the store buffer. A committed store counter in the IFU tracks the number of stores actually in the store buffer. The store buffer provides allocate and deallocate signals to accurately maintain the committed store counter. Alternatively, the IFU could determine allocation of stores in the store buffer. In this case, only a deallocate signal would be required of the store buffer. The IFU stops issuing stores to the store buffer once the speculative counter has reached a threshold value. Upon a flush, the IFU sets the speculative counter equal to the committed store counter. In this way, an efficient feedback mechanism is provided for preventing store buffer overflow that minimizes the store buffer size, operations time and power usage.

In accordance with various embodiments of the present invention, a method and apparatus provide overflow protection for a store buffer in an integrated circuit multithreaded processor or processor system that includes one or more processing elements or cores. Each processing element fetches, issues and executes instructions in a pipeline and generates store instructions that are buffered in a store buffer and issued to memory. A store buffer in each processing element buffers and issues store instructions in order, and may be implemented to hold entries for each thread being processed by the processing element. To control store buffer overflow, one or more counters in an instruction fetch unit are used to halt issuance of instructions to the pipeline while the counter meets or exceeds a threshold value. The counter(s) may be incremented each time a store instruction is issued to the pipeline, and may be decremented each time a store instruction is deallocated from the buffer using a single signal line to decrement the counter. For example, a first speculative counter in the instruction fetch unit may track the number of stores in the pipeline and committed to the store buffer. A second commit counter in the instruction fetch unit may be incremented by a pick unit component of the instruction fetch unit that tracks the progress of a store instruction through the integer pipeline and determines when the store instruction commits to the store buffer, or may alternatively be incremented by an allocate signal issued by the store buffer to the instruction fetch unit each time a store instruction commits to the store buffer. The second commit counter may be copied to the first speculative counter when a thread is flushed from the pipeline.

The objects, advantages and other novel features of the present invention will be apparent to those skilled in the art from the following detailed description when read in conjunction with the appended claims and accompanying drawings.

DETAILED DESCRIPTION

As explained herein, when multiple store operations are being processed by a multithreaded processor, the memory operations must be coordinated so that each thread can store data to the memory in an ordered and coherent way with minimal delay or latency. For purposes of providing an exemplary and not limiting description, it will be useful to describe the various aspects and embodiments of the invention herein in the context of data store operations to an on-chip cache memory system that is constructed with CMOS SRAM memory cells. However, the present invention is not limited to CMOS-based processes and may be used in connection with other categories of memory products, including without limitation, DRAM, ROM, flash, PLA and the like, whether integrated within a VLSI system, cache or non-cache, or a stand alone memory device.

Figure 3:
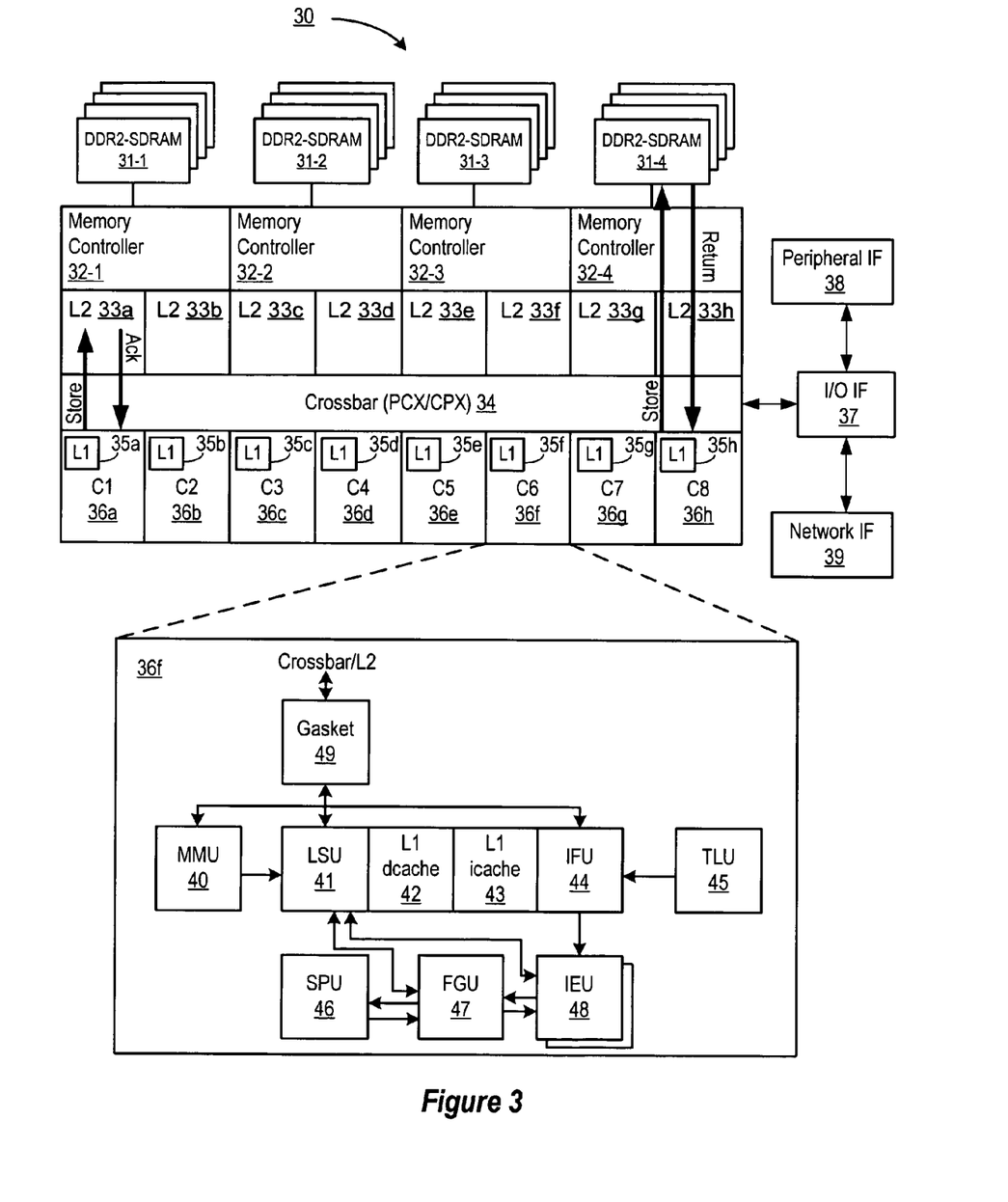
FIG. 3 illustrates a simplified schematic diagram of a processor chip having multiple processor cores for executing multiple threads, wherein each core contains a first level cache and the multiple cores share a second level cache in accordance with an exemplary embodiment of the invention.

A selected embodiment of the present invention is shown in FIG. 3, which depicts a simplified schematic diagram of a processor chip 30 having multiple processor cores for processing multiple threads. In the illustrated embodiment, processor chip 30 includes a plurality of processor cores 36a-h, which are also designated "C1" though "C8." Each of cores 36 is coupled to an L2 cache 33 via a crossbar 34. L2 cache 33 is coupled to one or more memory controller(s) 32, which are coupled in turn to one or more banks of system memory 31. Additionally, crossbar 34 couples cores 36 to input/output (I/O) interface 37, which is in turn coupled to a peripheral interface 38 and a network interface 39.

Cores 36 may be configured to execute instructions and to process data according to a particular instruction set architecture (ISA). In one embodiment, cores 36 may be configured to implement the SPARC V9 ISA, although in other embodiments, it is contemplated that any desired ISA may be employed, such as x86, PowerPC or MIPS, for example. In a selected embodiment, a highly suitable example of a processor design for the processor core is a SPARC processor core, UltraSPARC processor core or other processor core based on the SPARC V9 architecture. Those of ordinary skill in the art also understand the present invention is not limited to any particular manufacturer's microprocessor design. The processor core may be found in many forms including, for example, the 64-bit SPARC RISC microprocessor from Sun Microsystems, or any 32-bit or 64-bit microprocessor manufactured by Motorola, Intel, AMD or IBM. However, any other suitable single or multiple microprocessors, microcontrollers or microcomputers may be utilized. In the illustrated embodiment, each of cores 36 may be configured to operate independently of the others, such that all cores 36 may execute in parallel. In some embodiments, each of cores 36 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core may also be referred to as a multithreaded (MT) core. In an example embodiment shown in FIG. 3, each processor core includes eight threads. Thus, a single processor chip 30 with eight cores (C1 through C8) will have sixty-four threads in this configuration. However, it should be appreciated that the invention is not limited to eight processor cores, and that more or fewer cores can be included. In other embodiments, it is contemplated that core may process different numbers of threads. The example core 36f includes an instruction fetch unit (IFU) 44 that is coupled to a memory management unit (MMU) 40, a trap logic unit (TLU) 45, and at least one instruction execution unit (IEU) 48. Each of execution units 48 is coupled to both a floating point/graphics unit (FGU) 47 and a load store unit (LSU) 41. Each of the LSU units is also coupled to send data back to each of execution units 48 and FGU unit 47. FGU 47 is coupled to a stream processing unit (SPU) 46. Additionally, LSU 41, IFU 51 and MMU 40 are coupled to a gasket or interface unit 49 for interface to the crossbar 34.

Each processor core 36a-36h is in communication with crossbar 34 which manages data flow between cores 36 and the shared L2 cache 33 and may be optimized for processor traffic where it is desirable to obtain extremely low latency. The crossbar 34 may be configured to concurrently accommodate a large number of independent accesses that are processed on each clock cycle, and enables communication data requests from cores 36 to L2 cache 33, as well as data responses from L2 cache 33 to cores 36. In one embodiment, crossbar 34 may include logic (such as multiplexers or a switch fabric, for example) that allows any core 36 to access any bank of L2 cache 33, and that conversely allows data to be returned from any L2 bank to any core. Crossbar 34 may also include logic to queue data requests and/or responses, such that requests and responses may not block other activity while waiting for service. Additionally, in one embodiment crossbar 34 may be configured to arbitrate conflicts that may occur when multiple cores attempt to access a single bank of L2 cache 33 or vice versa. Thus, the multiple processor cores 36a-36h share a second level (L2) cache 33 through a crossbar bus 34.

The shared L2 cache 33 accepts requests from the processor cores 36 on the processor to cache crossbar (PCX) 34 and responds on the cache to processor crossbar (CPX) 34. As described herein, the L2 cache 33 is also responsible for maintaining coherency across all caches on the chip by keeping a copy of all L1 tags in a directory structure. The L2 cache 33 includes eight banks that are shared by the processor cores. It should be appreciated that, by sharing L2 cache banks, concurrent access may be made to the multiple banks, thereby defining a high bandwidth memory system. The invention is not limited to eight L2 cache banks or to any particular size, but the illustrated embodiment should be sufficient to provide enough bandwidth from the L2 cache to keep all of the cores busy most of the time. The L2 cache 33 includes an L2 data array and tag array configured to cache instructions and data for use by cores. In the illustrated embodiment, L2 cache 33 may be organized into eight separately addressable banks that may each be independently accessed, such that in the absence of conflicts, each bank may concurrently return data to any of the processor cores 36a-h. In some embodiments, each individual bank may be implemented using set-associative or direct-mapped techniques. For example, in one embodiment, L2 cache 33 may be a 4 megabyte (MB) cache, where each 512 kilobyte (KB) bank (e.g., 55a) is 16-way set associative with a 64 byte (64 B) cache line size, although other cache sizes and geometries are possible and contemplated. L2 cache 33 may be implemented in some embodiments as a writeback cache in which written (dirty) data may not be written to system memory until a corresponding cache line is evicted.

In connection with the example described herein, each processor core (e.g., 36f) shares an L2 cache memory 33 to speed memory access and to overcome the delays imposed by accessing remote memory subsystems (e.g., 31). Cache memory comprises one or more levels of dedicated high-speed memory holding recently accessed data, designed to speed up subsequent access to the same data. When data is read from main memory (e.g., 31), a copy is also saved in the L2 cache 33, and an L2 tag array stores an index to the associated main memory. The L2 cache 33 then monitors subsequent requests for data to see if the information needed has already been stored in the L2 cache. If the data had indeed been stored in the cache (i.e., a "hit"), the data is delivered immediately to the processor core 36 and the attempt to fetch the information from main memory 31 is aborted (or not started). If, on the other hand, the data had not been previously stored in L2 cache (i.e., a "miss"), the data is fetched from main memory 31 and a copy of the data and its address is stored in the L2 cache 33 for future access.

In some embodiments, L2 cache 33 may implement queues for requests arriving from and results to be sent to crossbar 34. Additionally, in some embodiments L2 cache 33 may implement a fill buffer configured to store fill data arriving from memory controller 32, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). L2 cache 33 may variously be implemented as single-ported or multi-ported (i.e., capable of processing multiple concurrent read and/or write accesses). In either case, L2 cache 33 may implement arbitration logic to prioritize cache access among various cache read and write requesters.

The L2 cache 33 is in communication with main memory controller 32 to provide access to the external memory 31 or main memory (not shown). Memory controller 32 may be configured to manage the transfer of data between L2 cache 33 and system memory, for example in response to L2 fill requests and data evictions. In some embodiments, multiple instances of memory controller 32 may be implemented, with each instance configured to control a respective bank of system memory. Memory controller 32 may be configured to interface to any suitable type of system memory, such as Double Data Rate or Double Data Rate 2 Synchronous Dynamic Random Access Memory (DDR/DDR2 SDRAM), or Rambus DRAM (RDRAM), for example. In some embodiments, memory controller 32 may be configured to support interfacing to multiple different types of system memory.

In the illustrated embodiment, processor chip 30 may be configured to receive data from sources other than system memory 31. I/O interface 37 may be configured to provide a central interface for such sources to exchange data with cores 36 and/or L2 cache 33 via crossbar 34. In some embodiments, I/O interface 37 may be configured to coordinate Direct Memory Access (DMA) transfers of data between network interface 39 or peripheral interface 38 and system memory 31 via memory controller 32. In addition to coordinating access between crossbar 34 and other interface logic, in one embodiment, I/O interface 37 may be configured to couple processor chip 30 to external boot and/or service devices. For example, initialization and startup of processor chip 30 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor chip 30, before the boot process proceeds to load data from a disk or network device. Additionally, in some embodiments such an external device may be configured to place processor chip 30 in a debug, diagnostic, or other type of service mode upon request.

Peripheral interface 38 may be configured to coordinate data transfer between processor chip 30 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 38 may implement one or more instances of an interface such as Peripheral Component Interface Express (PCI-Express), although it is contemplated that any suitable interface standard or combination of standards may be employed. For example, in some embodiments, peripheral interface 38 may be configured to implement a version of Universal Serial Bus (USB) protocol or IEEE 1394 (Firewire) protocol in addition to or instead of PCI-Express.

Network interface 39 may be configured to coordinate data transfer between processor chip 30 and one or more devices (e.g., other computer systems) coupled to processor chip 30 via a network. In one embodiment, network interface 39 may be configured to perform the data processing necessary to implement an Ethernet (IEEE 802.3) networking standard such as Gigabit Ethernet or 10-gigabit Ethernet, for example, although it is contemplated that any suitable networking standard may be implemented. In some embodiments, network interface 39 may be configured to implement multiple discrete network interface ports.

The multiprocessor chip 30 described herein and exemplified in FIG. 3 may be configured for multithreaded execution. More specifically, in one embodiment, each of cores 36 may be configured to perform fine-grained multithreading, in which each core may select instructions to execute from among a pool of instructions corresponding to multiple threads, such that instructions from different threads may be scheduled to execute adjacently. For example, in a pipelined embodiment of core 36f employing fine-grained multithreading, instructions from different threads may occupy adjacent pipeline stages, such that instructions from several threads may be in various stages of execution during a given core processing cycle.

Figure 4:
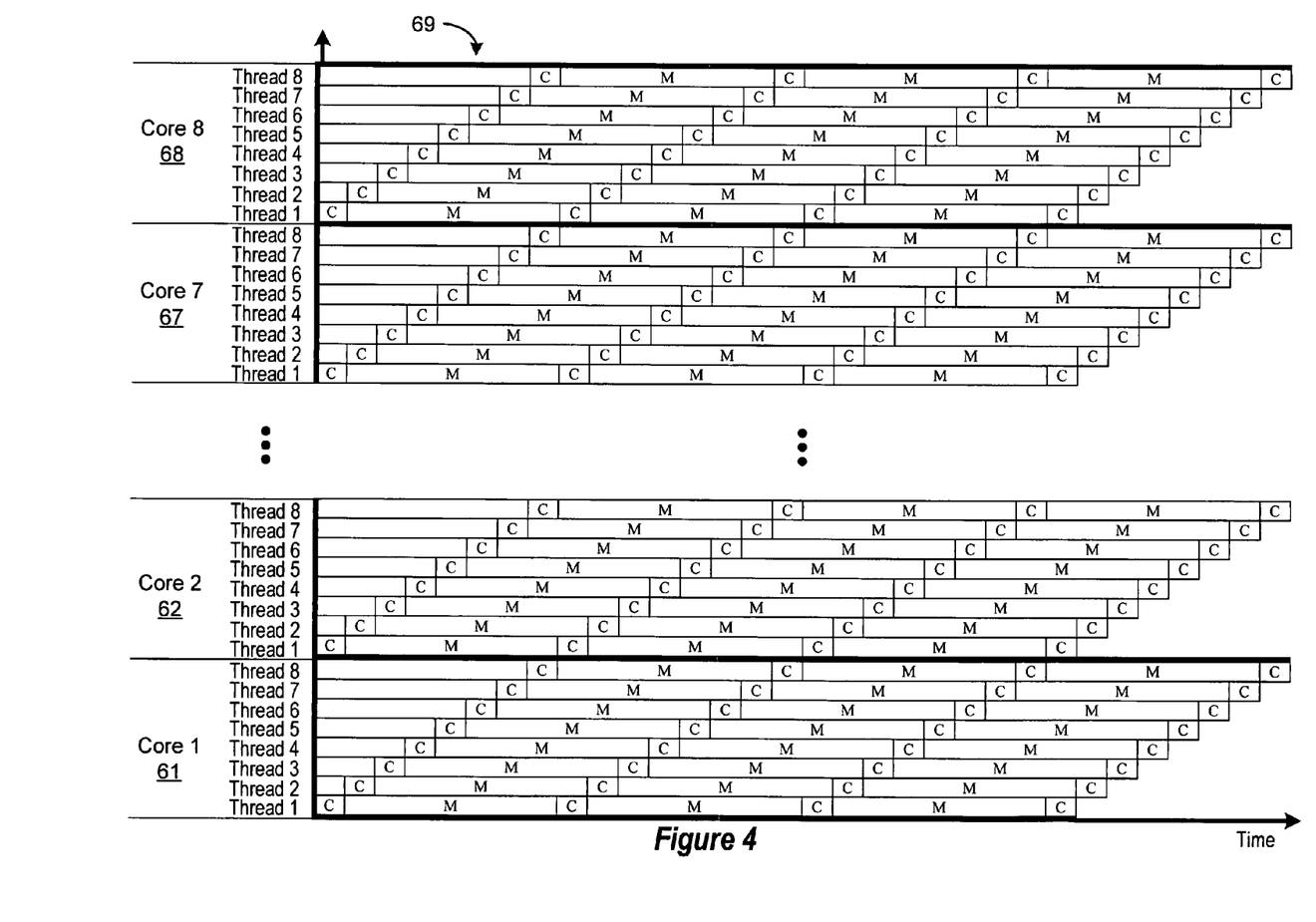
FIG. 4 is a timing diagram illustrating an execution flow of a vertical and horizontal multithread processor in accordance with an illustrative embodiment of the invention.

FIG. 4 is a timing diagram illustrating execution flow of a vertical and horizontal multithread multiprocessor embodiment of the invention using a high throughput architecture with eight processor cores 61-68, each having eight threads. In FIG. 4, the execution flow for a given vertical threaded processor 61 (e.g., Core 1) includes execution of multiple threads (e.g., Threads 1-8). For each thread in each core, the areas labeled "C" show periods of execution and the areas labeled "M" show time periods in which a memory access is underway, which would otherwise idle or stall the processor core. Thus, in the first processor core (Core 1), Thread 1 uses the processor core (during the times labeled as "C") and then is active in memory (during the times labeled as "M"). While Thread 1 in a given core is active in memory, Thread 2 in that same core accesses the processor core and so on for each of Threads 3-8. Vertical multithread processing is implemented by maintaining a separate processing state for each executing thread on a processing core. With only one of the threads being active at one time, each vertical multithreaded processor core switches execution to another thread during a memory access, such as on a cache miss. In this way, efficient instruction execution proceeds as one thread stalls and, in response to the stall, another thread switches into execution on the otherwise unused or idle pipeline. In essence, the pipeline overlaps the execution of multiple threads to maximize processor core pipeline utilization. As will be appreciated, the multiplicity of thread operations from a vertically threaded processor (e.g., core 1) will require a memory system that can process multiple references or threads simultaneously. For example, multiple store operations must be coordinated so that each thread can store data to the L1 cache 35, L2 cache 33 and/or system memory in an ordered and coherent way with minimal delay or latency and without overflowing the store buffer.

In accordance with a selected embodiment of the present invention, the processor cores can be replicated a number of times in the same area. This is also illustrated in FIG. 4, which illustrates the timing diagram for an execution flow of a horizontal threaded processor using a technique called chip multiprocessing. This technique combines multiple processor cores on a single integrated circuit die. By using multiple vertically threaded processors—each of which (e.g., Core 1) is vertically threaded—a processor system is formed with both vertical and horizontal threading, augmenting executing efficiency and decreasing latency in a multiplicative fashion. The execution flow 69 illustrated in FIG. 4 for a vertical and horizontal threaded processor includes execution of threads 1-8 on a first processor core (Core 1), execution of threads 1-8 on a second processor core (Core 2), and so on with processor cores 3-8. Execution of threads 1-8 on the first processor core (Core 1) illustrates vertical threading. Similarly, execution of threads 1-8 on the second processor (Core 2) illustrates vertical threading. Where a single system or integrated circuit includes more than one processor core, the multiple processor cores executing multiple threads in parallel is a chip multi-threading (CMT) processor system. The combination of vertical multithreading and horizontal multithreading increases processor parallelism and performance, and attains an execution efficiency that exceeds the efficiency of a processor with only vertical multithreading. The combination of vertical multithreading and horizontal multithreading also advantageously reduces communication latency among local (on-chip) multi-processor tasks by eliminating much signaling on high-latency communication lines between integrated circuit chips. Horizontal multithreading further advantageously exploits processor speed and power improvements that inherently result from reduced circuit sizes in the evolution of silicon processing. However, with the use of vertically and horizontally threaded processors, the coordination requirements for the resulting multiplicity of thread operations from multiple processors (e.g., cores 1-8) will require a memory system that can coordinate multiple store operations where, for example, each thread must store data to the L1 cache 35, L2 cache 33 and/or system memory in an ordered and coherent way and without overflowing the store buffer. The challenges presented in managing the store buffer operations are elevated when the processor core must handle multiple threads on the same core.

Figure 5:
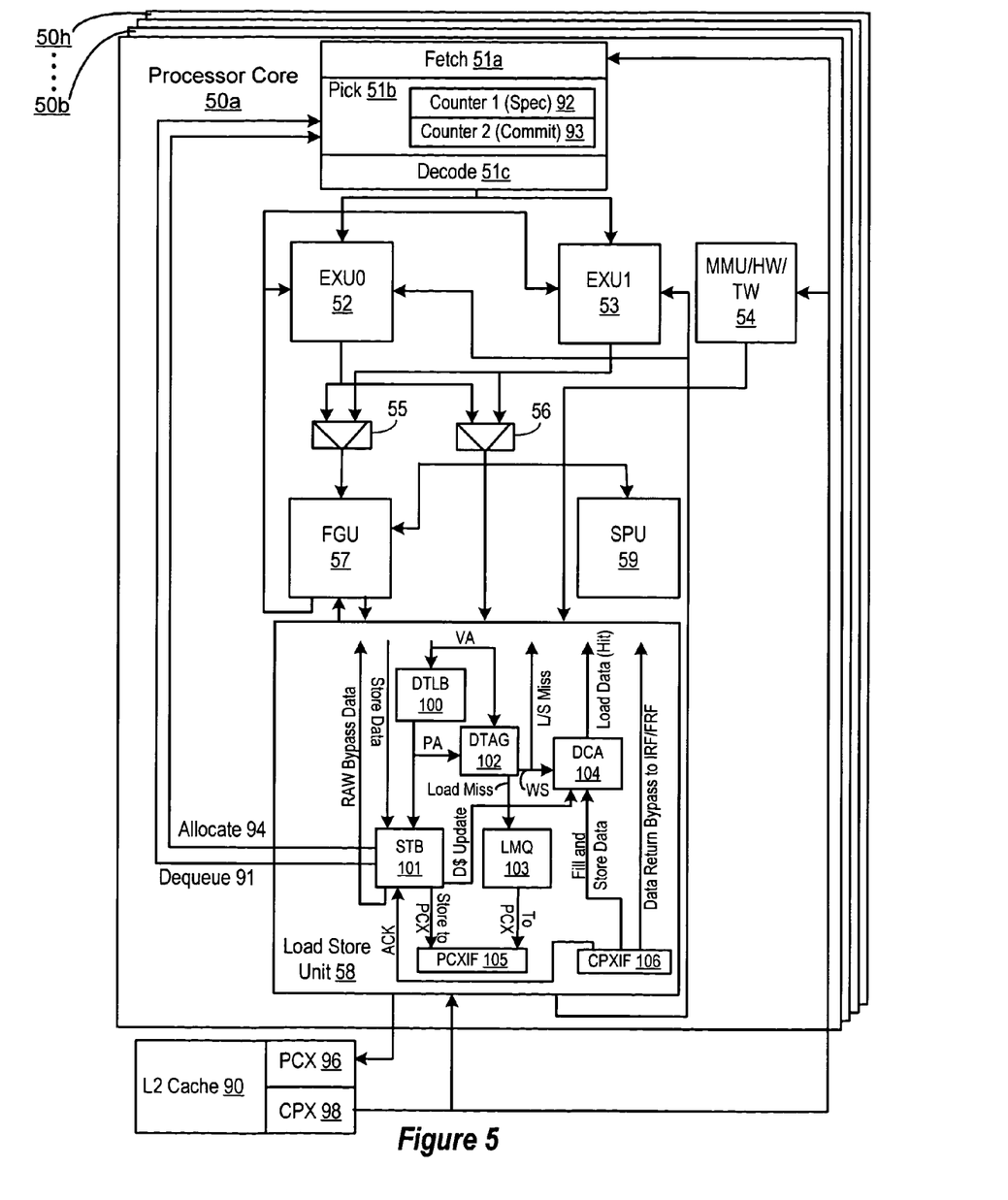
FIG. 5 is a simplified schematic block diagram of a store buffer system in accordance with an illustrative embodiment of the invention.

FIG. 5 illustrates a simplified schematic block diagram of a store buffer system in accordance with an illustrative embodiment of the invention in which the store buffer operations are optimized to expedite store operations with minimal communication overhead. In the illustrative embodiment depicted in FIG. 5, each processor core (e.g., 50a) may be configured to perform fine-grained horizontal multithreading operations. The depicted core 50a includes an instruction fetch unit (IFU) 51 that is coupled to a memory management unit (MMU) 54 and at least one instruction execution unit (IEU) 52, 53. Each of execution units 52, 53 is coupled via connection circuits 55, 56 to both a floating point/graphics unit (FGU) 57 and a load store unit (LSU) 58. FGU 57 is coupled to a stream processing unit (SPU) 59. Additionally, LSU 58, IFU 51 and MMU 54 are coupled directly or indirectly to the L2 cache 90 via crossbar 96, 98. The instruction fetch unit (IFU) 51 retrieves instructions for each thread and stores them in an instruction cache and instruction buffers in the fetch unit 51a (not shown). Pick unit 51b then selects two instructions to execute among eight different threads, and provides the instructions to the decode unit 51c which decodes one instruction each from two thread groups per cycle and supplies the pre-decoded instruction to the execution units 52, 53. Each integer execution unit includes an arithmetic logic unit (ALU), shifter, integer register files for processing and storing thread status information. Execution unit results are supplied via selection circuits 55, 56 to the shared FGU 57 and LSU 58. The shared LSU 58 handles memory references between the processor core, the L1 data cache and the L2 cache.

While store buffers may be used throughout a processor to manage store operations to a cache or memory, FIG. 5 depicts an example implementation of a store buffer in the LSU 58 which includes a store buffer (STB) 101 for holding all outstanding store instructions. The STB 101 may be threaded and contain eight entries per thread. All loads to the processor core 50a check the STB 101 (same thread only) for read-after-write (RAW) bypass 58 opportunities. LSU 58 may also include a load miss queue (LMQ) 103 configured to store records of pending memory accesses that have missed in data cache 102, 104. Additionally, in some embodiments LSU 58 may include logic configured to translate virtual data addresses generated by execution units 48 to physical addresses, such as a Data Translation Lookaside Buffer (DTLB) 100.

In operation, a sequence of store instructions is inserted into the STB 101 for delivery to the L2 cache 90 after address translation through the DTLB 100. The buffered stores in STB 101 are issued in age order (per thread) through the PCX interface 105 to the L2 cache 90. The L2 cache 90 processes each store in the sequence in turn. Once a store operation is completed (e.g., a store to the L2 cache 90), an acknowledgement signal (ACK) is returned via e the CPX interface 106 to the store buffer 101 which may be used to deallocate or dequeue a store from the STB 101. In this way, the store buffer 101 can notify the IFU 51 when an entry in the STB 101 is deallocated, and the IFU 51 can thereby keep track of the number of stores per thread that are in the STB 101 and in the pipeline to ensure that the STB 101 never overflows. Control logic for the STB 101 is used to control store issuance using a pseudo-LRU (least recently used) algorithm to select which thread to issue. The store remains in the STB 101 until an acknowledgment (ACK) is received via the CPX interface 106 from the L2 cache 90, and if necessary, the data cache array 102, 104 is then updated with the store data that has been held in the STB 101 or returned from the L2 cache memory 90. Control logic in the STB 101 may be included to keep track of any stores in the buffer that are dequeued and to generate a dequeue signal 91 that is used to decrement the commit and speculative counters 92, 93. In addition, control logic may also keep track of stores that are committed to the store buffer 101 in order to generate an allocate signal 94 that is used to increment the commit and speculative counters 92, 93.

In a selected embodiment, overflow control for the store buffer is provided by maintaining a counter in the IFU 51 that is used to halt the IFU from issuing instructions when a threshold count is reached. In an exemplary implementation, a first counter (or speculative counter) 92 in the pick unit 51b keeps track of stores in the pipeline plus the number of committed stores, and a second counter (or committed counter) keeps track of stores committed to the store buffer 101. As will be appreciated by those of ordinary skill in the art, a store is committed to the store buffer once it reaches a stage in the processor pipeline where the store instruction will necessarily end up being placed in the store buffer 101. Control logic in the IFU 51 may be provided to calculate the count of stores committed to the store buffer 101. For example, control logic in the pick unit 51b may implement a state machine that has the ability to decode pre-fetched instructions for purposes of determining if they are store instructions. When a store is picked by the pick unit 51b and sent to the pipeline, the speculative counter 92 is incremented. When the IFU 51 determines that a store has reached the commit point, the commit counter 93 is incremented. When the speculative counter 92 indicates the buffer is full and another store is ready, the IFU halts executing to prevent additional instructions from issuing in the pipeline. Once a store in the store buffer 101 has been processed and dequeued, a feedback dequeue signal 91 from the store buffer 101 informs pick unit 51b that a store has been dequeued. The dequeue signal 91 may be used to decrement both counters 92, 93.

In an alternative embodiment, the control logic in the IFU 51 required to track stores committed to the store buffer 101 may be replaced by an additional allocate signal 94 issued by the store buffer 101 every time a store reaches the buffer 101. The allocate signal 94 may be used to increment the commit counter 93. This feedback signal can also be used as a failsafe backup to the control logic in the IFU 51 for tracking store commits to the store buffer.

As described herein, control logic in the IFU 51 decrements both counters 92, 93 in response to the dequeue signal 91. Once the speculative count is below the threshold value, the IFU restarts execution to issue instructions to the pipeline. The control logic may also update the counters 91, 92 when a thread is flushed by simply copying the value in the commit counter 93 to the speculative counter 92. This reflects the fact that, during a flush, stores in the pipeline but not yet committed to the STB 101 are removed from the pipeline, leaving only committed stores in the pipeline.

Figure 6:
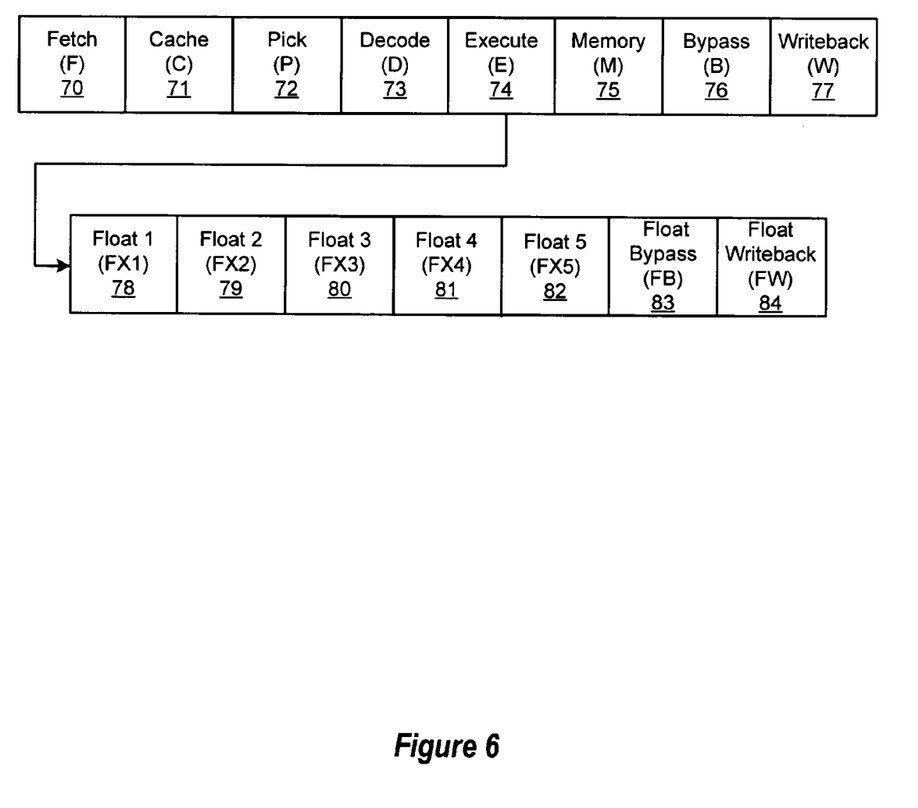
FIG. 6 is a simplified schematic diagram of the pipeline stages for a single issue in-order pipeline executed within a thread.

The beneficial effect of the controlling store buffer operations in accordance with the present invention may also be illustrated with reference to FIG. 6, which illustrates a pipeline diagram showing the flow of integer instructions through one embodiment of a core (e.g., 50a), whereby multiple threads are pipelined so that processing of new instructions may begin before older instructions have completed. As a result, multiple instructions from various threads may be in various stages of processing during a given core execution cycle. In the illustrated embodiment, execution of integer instructions is divided into eight stages, denoted as the Fetch (F) stage 70, the Cache stage (C) 71, the Pick stage (P) 72, the Decode (D) stage 73, the Execute (E) stage 74, the Memory (M) stage 75, the Bypass (B) stage 76 and the Writeback (W) stage 77. In other embodiments, it is contemplated that different numbers of pipe stages corresponding to different types of functionality may be employed. It is further contemplated that other pipelines of different structure and depth may be implemented for integer or other instructions. For example, floating-point instructions may execute in a longer pipeline than integer instructions, such as the twelve stage floating-point pipeline that starts with the first five stages 70-74 of the instruction pipeline (F-C-P-D-E), and then proceeds from the execution stage 74 to the five execution stages 78-82, the float bypass stage 83 and the float writeback stage 84.

The first four stages (F-C-P-D) of the illustrated integer pipeline 70-77 may generally correspond to the functioning of instruction fetch unit 51, and function to deliver instructions to the execution units 52, 53. The final four stages (E-M-B-W) of the illustrated integer pipeline may generally correspond to the functioning of LSU 58. Each time a store instruction is issued into the Fetch Pick stage (72) of the pipeline by the IFU, a speculative counter is incremented. Thus, the speculative counter identifies all stores in the pipeline stages 72-76 plus those that have reached the Writeback stage 77 and been committed. The speculative store counter is checked before issuance to see if the count has reached the threshold count, in which case issuance is halted until the count is below the threshold count. A commit counter is also maintained to keep track of any stores that have made it to the write stage (W) of the pipeline, at which point (in this example) the store is committed to the store buffer. The commit count may be calculated at the IFU with control logic and/or may be provided by monitoring an allocate signal from the store buffer that identifies each store that commits to the store buffer. As will be appreciated, the threshold count that is used to halt instruction issuance can be set at any value, depending on the applicable processing requirements and architectural considerations. However, in a selected embodiment, the threshold count of 8 used for a store buffer with 8 entries is sufficient to make the impact of store buffer stalls negligible in multi-threaded operation.

Figure 7:
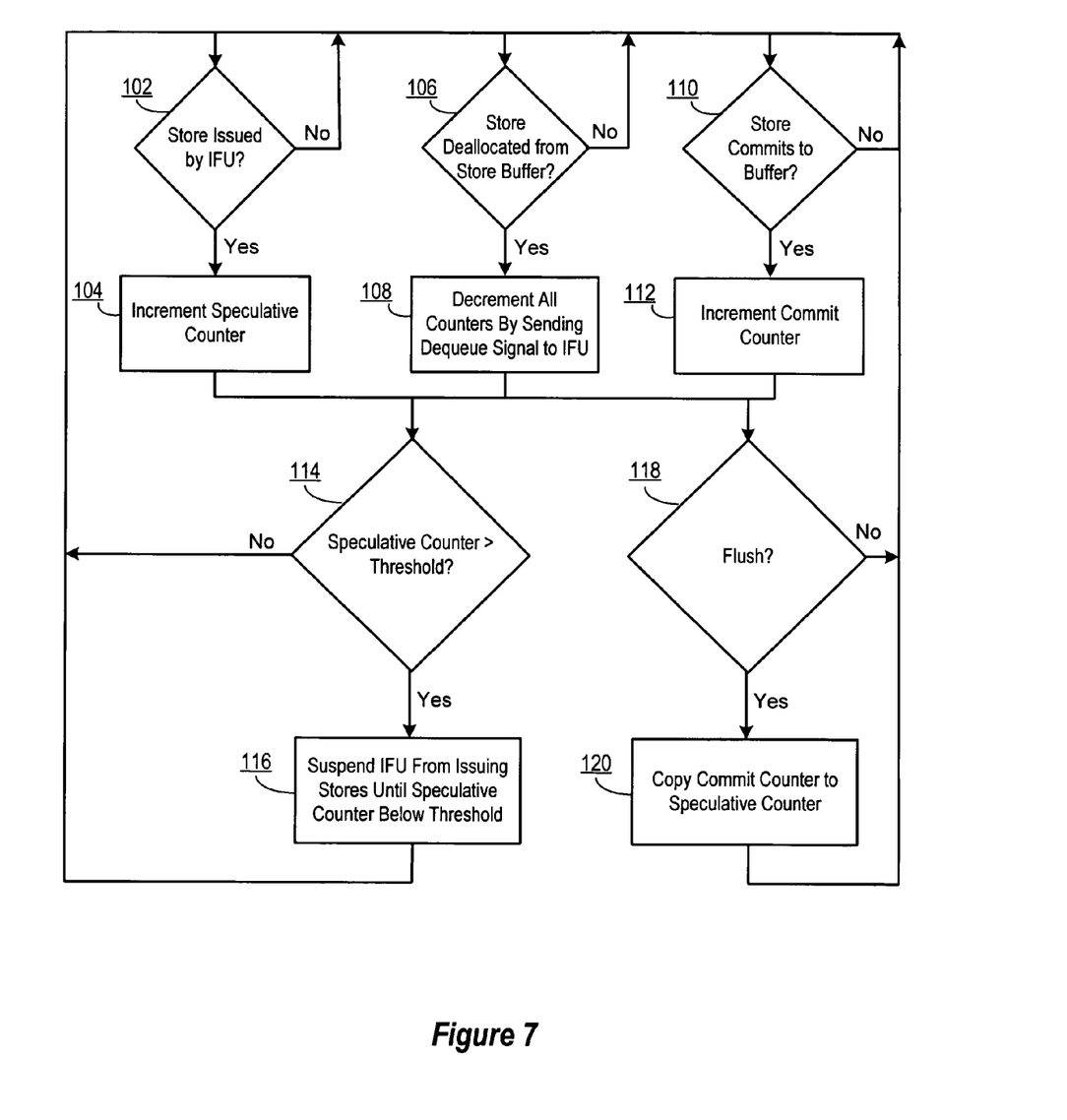
FIG. 7 depicts an exemplary flow methodology for managing store buffer operations.

Turning now to FIG. 7, an exemplary method is illustrated for managing store buffer operations to provide for efficient use of the store buffer implementing a coherency system that reduces or avoids conflicting memory accesses in cache memories. As will be appreciated, the methodology illustrated in FIG. 7 follows the processing of a series of store instructions for a given thread as they issue from the instruction fetch unit into the pipeline, and are finally transmitted from the store buffer. In a multithreaded processor implementation, the disclosed methodology may be implemented in a pipelined fashion for each thread to more efficiently manage the store buffer operations pertaining to each thread.

The methodology may be described by starting with step 102, where the instruction fetch unit issues a store request to the pipeline. Each time a store instruction is issued, a speculative counter is incremented (step 104), and if the speculative counter is not exceed a predetermined threshold value (negative outcome to decision 114), the process loops back to wait for the next event. As store instructions are issued by the IFU into the pipeline, this sequence repeats until the speculative counter exceeds the threshold (affirmative outcome to decision 114), at which point the IFU is suspended from issuing additional store instructions for that thread (step 116) until such time as the speculative counter no longer exceeds the threshold.

The speculative counter can be decremented below the threshold in the event the thread is flushed by replacing the speculative counter value with the commit counter value (step 120) any time a flush for that thread is detected (affirmative outcome to detection step 118). This reflects the fact that a flush removes stores from the pipeline that have not yet reached the commit point. As depicted, the commit counter is incremented (step 112) each time a store commits to the store buffer (affirmative outcome to detection step 110), such as by reaching the commit point in the pipeline. The commit counter is also decremented each time a store is deallocated from the store buffer (steps 106, 108), thereby eliminating the need to send back a commit count signal with the attendant wiring and timing overhead.

The speculative counter can also be decremented below the threshold as stores are deallocated from the store buffer. This is illustrated in FIG. 7, where a store being deallocated from the store buffer is detected (affirmative outcome at decision block 106), thereby causing the store buffer to send a dequeue signal to the IFU to decrement the counters (step 108). As stores are deallocated at the store buffer, the speculative counter (and commit counter) is decremented below the threshold, at which time the IFU is allowed to issue new store instructions.

As will be appreciated, the methodology of the present invention may be thought of as performing the identified sequence of steps in parallel (as depicted in FIG. 7), though the steps may also be performed sequentially, in a different order or as independent operations that separately control the counters described herein.

As described herein, store buffer operation and control is optimized by efficiently providing overflow feedback from the store buffer to the front end of the pipeline. Not only are the circuit layout and timing performance improved, but processor performance is improved by preventing buffer overflow conditions that require a flush of the pipeline. In particular, by using the feedback signal to increment and decrement the store counters, store buffer overflow may be prevented in a way that allows the store buffer to be more fully utilized than was possible with conventional solutions, such as using a high water mark strategy which assumes that every stage in the pipeline is filled with store instructions. Thus, a selected embodiment of the present invention allows for maximum utilization of all buffer entries while keeping communication to a minimum (one wire per buffer). In a highly threaded system, this efficiency is important as it increases the rate of processing store instructions by reducing the occurrences of the store buffer being full. This allows the store buffer 101 to be constructed as a smaller buffer, leading to smaller area and better timing. In addition, fewer wires can be used for communication and it allows full use of all store buffer entries without having to flush and backtrack a thread.

As set forth above, a method and apparatus for managing store buffer operations is described. For clarity, only those aspects of the chip multithreading (CMT) processor system germane to the invention are described, and product details well known in the art are omitted. For the same reason, the computer hardware is not described in further detail. It should thus be understood that the invention is not limited to any specific logic implementation, computer language, program, or computer. While various details are set forth in the above description, it will be appreciated that the present invention may be practiced without these specific details. For example, selected aspects are shown in block diagram form, rather than in detail, in order to avoid obscuring the present invention. Some portions of the detailed descriptions provided herein are presented in terms of algorithms or operations on data within a computer memory. Such descriptions and representations are used by those skilled in the field of microprocessor design to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that throughout the description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

While the present invention has been particularly described with reference to FIGS. 1-7 and with emphasis on certain memory structures, it should be understood that the figures are for illustration purposes only and should not be taken as limitations upon the present invention. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A single chip multithreaded processor comprising:
    at least one processor core comprising a plurality of resources for forming an integer pipeline that generates store instructions, said processor core comprising:
    an instruction fetch unit for providing instructions to said integer pipeline, said instruction fetch unit comprising a first counter for counting only store instructions wherein the first counter is arranged to increment each time a store instruction is issued to the integer pipeline; and
    a store buffer for buffering only store instructions and issuing said store instructions in order, wherein the store buffer is arranged to issue a dequeue signal to the instruction fetch unit each time a store instruction is deallocated from the store buffer;
    wherein said instruction fetch unit is arranged to decrement the first counter each time a dequeue signal is received from the store buffer and halt issuance of instructions to the integer pipeline while the first counter is above a threshold value;
    wherein the instruction fetch unit further comprises a second counter which is arranged to increment each time a store instruction commits to the store buffer in the integer pipeline and decrement each time a store instruction is deallocated from the store buffer; and
    wherein the processor is arranged to copy the second counter to the first counter when a thread is flushed from the integer pipeline, and wherein the processor is arranged to flush the thread from the pipeline by removing only store instructions from the pipeline that are not committed to the store buffer.

2. The single chip multithreaded processor of claim 1, wherein the instruction fetch unit comprises a pick unit for tracking the progress of a store instruction through the integer pipeline and determining when the store instruction commits to the store buffer.

3. The single chip multithreaded processor of claim 1, wherein the store buffer is arranged to issue an allocate signal to the instruction fetch unit each time a store instruction commits to the store buffer, where the processor is arranged to use said allocate signal to increment the second counter.

4. The single chip multithreaded processor of claim 2, wherein the pick unit is arranged to suspend issuing instructions to the integer pipeline while the first counter is above the threshold value.

5. The single chip multithreaded processor of claim 1, where the store buffer comprises a plurality of entries for each thread being processed by said processor core.

6. The single chip multithreaded processor of claim 1, wherein said processor core comprises a plurality of processor cores, where each processor core comprises a store buffer that is arranged to issue an allocate signal to a second counter in the instruction fetch unit for that processor core each time a store instruction commits to the store buffer and issue a dequeue signal to decrement the first and second counters each time a store instruction is deallocated from the store buffer.

7. The single chip multithreaded processor of claim 1, wherein the instruction fetch unit is arranged to provide instructions to the integer pipeline when the first counter is at or below the threshold value.

8. A processor system comprising:
    at least one processing element for forming a pipeline that generates store instructions, said processing element comprising:
    a store buffer for buffering store instructions to be issued by the processing element in order;

means for issuing a dequeue signal each time a store instruction is deallocated from the store buffer;

means for issuing instructions to the pipeline, comprising a first counter which is arranged to be incremented each time a store instruction is issued to the pipeline and decremented each time a dequeue signal is issued received from the store buffer, said means for providing instructions further comprising a means for halting issuance of instructions to the pipeline while the first counter is above a threshold value;

wherein the means for issuing instructions further comprises a second counter which is arranged to be incremented each time a store instruction commits to the store buffer in the pipeline and decremented each time a store instruction is deallocated from the store buffer; and wherein the processor system is arranged to copy the second counter to the first counter when a thread is flushed from the pipeline, and wherein the processor system is arranged to flush the thread from the pipeline by removing only store instructions from the pipeline that are not committed to the store buffer.

9. The processor system of claim 8, wherein said processing element is constructed on a single integrated circuit.

10. The processor system of claim 8, further comprising means for issuing an allocate signal each time a store instruction commits to the store buffer, where said allocate signal is used to increment the second counter.

11. The processor system of claim 8, wherein the means for issuing instructions comprises an instruction fetch unit.

12. The processor system of claim 8, wherein the means for issuing a dequeue signal comprises a single signal line connected between the store buffer and the means for issuing instructions.

13. The processor system of claim 8, where the store buffer comprises a plurality of entries for each thread being processed by said processing element.

14. In a multithreaded processor comprising a store buffer and an instruction fetch unit for issuing instructions to a pipeline, a method for protecting against overflow of the store buffer, comprising:

issuing instructions to the pipeline from the instruction fetch unit;

incrementing a first counter each time a store instruction is issued to the pipeline;

issuing a dequeue signal from the store buffer to the instruction fetch unit each time a store instruction is deallocated from the store buffer;

decrementing the first counter each time a dequeue signal is received from the store buffer;

halting issuance of instructions to the pipeline while the first counter is above a threshold value;

issuing an allocate signal from the store buffer to the instruction fetch unit each time a store instruction commits to the store buffer in the pipeline;

incrementing a second counter each time a store instruction commits to the store buffer in the pipeline;

decrementing the second counter each time a store instruction is deallocated from the store buffer;

copying the second counter to the first counter when a thread is flushed from the pipeline; and flushing the thread from the pipeline by removing only store instructions from the pipeline that are not committed to the store buffer.

15. The method of claim 14, wherein the issuing of a dequeue signal from the store buffer to the instruction fetch unit comprises issuing a dequeue signal on a single signal line.

* * * * *